(12) United States Patent
Haines et al.

(10) Patent No.: US 11,428,267 B2
(45) Date of Patent: Aug. 30, 2022

(54) ELECTRICALLY CONDUCTIVE BEARINGS

(71) Applicant: SAINT-GOBAIN PERFORMANCE PLASTICS RENCOL LIMITED, Coventry (GB)

(72) Inventors: Paul Haines, Bristol (GB); Jan Fluegge, Cologne (DE); Daniel Tobias, Brno (CZ); Martin Schwiegel, Cologne (DE); Hans-Juergen Jaeger, Huerth (DE); Florian Foerster, Duisburg (DE); Emre Ulbay, Istanbul (TR); Sebastian Giesen, Viersen (DE); Mehmet Usta, Istanbul (TR); Jiri Zlebek, Nový Jičín (CZ); Juergen Freese, Meerbusch (DE); Juan Vaya Valcarce, Barcelona (ES)

(73) Assignee: SAINT-GOBAIN PERFORMANCE PLASTICS RENCOL LIMITED, East Leake (GB)

( * ) Notice: Subject to any disclaimer, the term of this patent is extended or adjusted under 35 U.S.C. 154(b) by 0 days.

(21) Appl. No.: 17/091,268

(22) Filed: Nov. 6, 2020

(65) Prior Publication Data

US 2021/0140486 A1     May 13, 2021

Related U.S. Application Data

(60) Provisional application No. 62/932,415, filed on Nov. 7, 2019.

(51) Int. Cl.
*F16C 33/12* (2006.01)
*F16C 17/02* (2006.01)
*F16C 27/02* (2006.01)

(52) U.S. Cl.
CPC ............ *F16C 33/122* (2013.01); *F16C 17/02* (2013.01); *F16C 27/02* (2013.01); *F16C 33/121* (2013.01); *F16C 2202/32* (2013.01)

(58) Field of Classification Search
CPC .......... F16C 17/02; F16C 25/04; F16C 27/02; F16C 33/12; F16C 33/121; F16C 33/122; F16C 33/125; F16C 33/24; F16C 2202/32
See application file for complete search history.

(56) References Cited

U.S. PATENT DOCUMENTS

| 3,355,695 A | 11/1967 | Overesch |
| 7,661,960 B2 | 2/2010 | Tanoi et al. |

(Continued)

FOREIGN PATENT DOCUMENTS

| DE | 202008014995 U1 | 3/2009 |
| EP | 2476566 A1 | 7/2012 |

(Continued)

OTHER PUBLICATIONS

International Search Report and Written Opinion for PCT/EP2020/081326, dated Feb. 18, 2021, 14 pages.

(Continued)

*Primary Examiner* — James Pilkington
(74) *Attorney, Agent, or Firm* — Abel Schillinger, LLP; David G Miranda

(57) ABSTRACT

A bearing including a generally cylindrical sidewall including an electrically conductive substrate, and an electrically non-conductive or low-conductive sliding layer coupled to the substrate, where the generally cylindrical sidewall includes a plurality of protrusions protruding radially inward or radially outward from a bore defining a central axis, where at least one protrusion is adapted to contact an opposing component such that at a point of contact the bearing has a void area free of sliding layer so as to provide electrical conductivity between the bearing and the opposing component, and wherein at least one protrusion has a spring (Continued)

rate of not greater than 30 kN/mm, such as not greater than 25 kN/mm, such as not greater than 15 kN/mm, or such as not greater than 10 kN/mm.

17 Claims, 9 Drawing Sheets

(56) References Cited

U.S. PATENT DOCUMENTS

| | | |
|---|---|---|
| 8,505,164 B2 | 8/2013 | Katou |
| 8,746,981 B2 | 6/2014 | Hartmann |
| 9,022,683 B2 | 5/2015 | Nais et al. |
| 9,543,801 B2 * | 1/2017 | Horng .................. H02K 5/10 |
| 10,738,519 B2 | 8/2020 | Eisenschenk et al. |
| 2006/0228174 A1 | 10/2006 | Woodhead et al. |
| 2011/0076096 A1 * | 3/2011 | Slayne .................. F16C 27/02 |
| | | 403/372 |
| 2012/0240350 A1 | 9/2012 | Natu et al. |
| 2015/0114549 A1 | 4/2015 | Slayne et al. |
| 2019/0093401 A1 | 3/2019 | Hoenig et al. |
| 2019/0190345 A1 | 6/2019 | Childs |

FOREIGN PATENT DOCUMENTS

| | | | |
|---|---|---|---|
| WO | WO2016/060660 | * | 4/2016 |
| WO | 2021089804 A1 | | 5/2021 |

OTHER PUBLICATIONS

Smith J W: "Presenting examples of MOTOR-OVERLOAD-PROTECTION applications from the APPLIANCE and AUTOMOTIVE industries", IEEE Industry Applications Magazine, IEEE Service Center, Piscataway, NJ, US, vol. 8, No. 5, Sep. 1, 2002 (Sep. 1, 2002), pp. 74-82, XP011093338, ISSN: 1077-2618, DOI: 10. 1109/MIA.2002.1028393 p. 74-p. 82; figures 1-17.

* cited by examiner

ELECTRICALLY CONDUCTIVE BEARINGS

CROSS-REFERENCE TO RELATED APPLICATION(S)

This application claims priority under 35 U.S.C. § 119(e) to U.S. Provisional Application No. 62/932,415, entitled "ELECTRICALLY CONDUCTIVE BEARINGS," by Paul HAINES et al., filed Nov. 7, 2019, which is assigned to the current assignee hereof and incorporated herein by reference in its entirety.

FIELD OF THE DISCLOSURE

This disclosure generally relates to bearings and, in particular, to bearings having an electrical conduction path.

BACKGROUND

Commonly, bearings constrain relative movement to the desired motion and reduce friction between moving parts. One type bearing may be located in a gap between the outer surface of an inner component and the inner surface of the bore of an outer component within an assembly. Exemplary assemblies may include door, hood, tailgate, and engine compartment hinges, seats, steering columns, flywheels, driveshaft assemblies, or may include other assemblies notably those used in automotive applications. Sometimes, there exists a need to have certain electrical properties across components such as the inner component (such as a shaft) and the outer component (such as a housing) in such an assembly. Therefore, there exists is an ongoing need for improved bearings that provide improved electrical properties while maintaining a longer lifetime of the assembly.

BRIEF DESCRIPTION OF THE DRAWINGS

The present disclosure may be better understood, and its numerous features and advantages made apparent to those skilled in the art by referencing the accompanying drawings.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention. The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or assembly that comprises a list of features is not necessarily limited only to those features but may include other features not expressly listed or inherent to such method, article, or assembly. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single embodiment is described herein, more than one embodiment may be used in place of a single embodiment. Similarly, where more than one embodiment is described herein, a single embodiment may be substituted for that more than one embodiment.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the bearing and bearing assembly arts.

Figure 1:
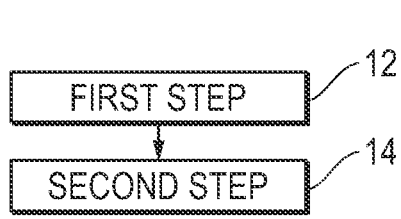
FIG. 1 includes a method of producing a bearing in accordance with an embodiment.

For purposes of illustration, FIG. 1 includes a diagram showing a forming process 10 for forming a bearing. The forming process 10 may include a first step 12 of providing a material or composite material including a substrate. Optionally, the forming process 10 may further include a second step 14 of curling the ends of the material or composite material to form a bearing.

Figure 2A:
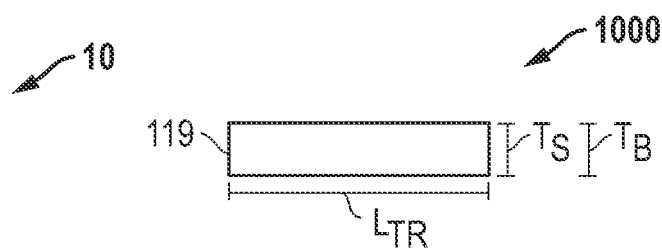
FIG. 2A includes a cross-sectional view of one embodiment of a bearing in accordance with an embodiment.

FIG. 2A includes an illustration of a material 1000 that may be formed into the bearing of the first step 12 of the forming process 10. The bearing may include a substrate 119. In an embodiment, the substrate 119 can at least partially include a metal. According to certain embodiments, the metal may include iron, copper, titanium, tin, aluminum, alloys thereof, or may be another type of metal. More particularly, the substrate 119 can at least partially include a steel, such as, a stainless steel, carbon steel, or spring steel. For example, the substrate 119 can be formed of stainless steel and may be annealed, ¼ hard, ½ hard, ¾ hard, or full hard. Moreover, the steel can include stainless steel including chrome, nickel, or a combination thereof. A particular stainless steel is 301 stainless.

In an embodiment, the substrate 119 may include a woven mesh or an expanded metal grid. The woven mesh or expanded metal grid can include a metal or metal alloy such as aluminum, steel, stainless steel, bronze, or the like. In an alternate embodiment, the substrate 119 may not include a mesh or grid. Further, the substrate 119 can include a Vickers pyramid number hardness, VPN, which can be ≥150, such as ≥250, ≥375, ≥400, ≥425, or ≥450. VPN can also be ≤500, ≤475, or ≤450. VPN can also be within a range between, and including, any of the VPN values described herein. In another aspect, the substrate 119 can be treated to increase its corrosion resistance. In particular, the substrate 119 can be passivated. For example, the substrate 119 can be passivated according to the ASTM standard A967. The substrate 119 may be formed by at least one of chamfering, turning, reaming, forging, extruding, molding, sintering, rolling, or casting. The substrate 119 may be an electrically conductive substrate, e.g. includes a material that is conductive.

In a number of embodiments, the substrate 119 may be spring steel. The spring steel substrate 119 can be may be annealed, ¼ hard, ½ hard, ¾ hard, or full hard. The spring steel substrate 119 may have a tensile strength of not less than 600 MPa, such as not less than 700 MPa, such as not less than 750 MPa, such as not less than 800 MPa, such as not less than 900 MPa, or such as not less than 1000 MPa. The spring steel substrate may have a tensile strength of no greater than 1500 MPa, or such as no greater than 1250 MPa.

The substrate 119 can have a thickness Ts of between about 10 microns to about 1500 microns, such as between about 50 microns and about 1000 microns, such as between about 100 microns and about 750 microns, such as between about 350 microns and about 650 microns. In a number of embodiments, the substrate 119 may have a thickness Ts of between about 700 and 800 microns. In a number of embodiments, the substrate 119 may have a thickness Ts of between about 950 and 1050 microns. It will be further appreciated that the thickness Ts of the substrate 119 may be any value between any of the minimum and maximum values noted above. The thickness of the substrate 119 may be uniform, i.e., a thickness at a first location of the substrate 119 can be equal to a thickness at a second location therealong. The thickness of the substrate 119 may be non-uniform, i.e., a thickness at a first location of the substrate 119 can be different from a thickness at a second location therealong.

Figure 2B:
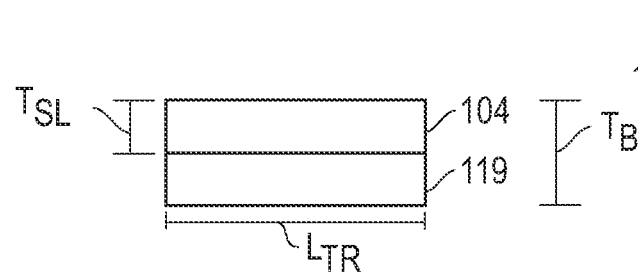
FIG. 2B includes a cross-sectional view of one embodiment of a bearing in accordance with an embodiment.

FIG. 2B includes an illustration of a composite material 1001, alternative to the material 1000, that may be formed into the bearing of the first step 12 of the forming process 10. For purposes of illustration, FIG. 2B shows the layer-by-layer configuration of a composite material 1001 of the bearing. In a number of embodiments, the composite material 1001 may include substrate 119 (as mentioned above) and sliding layer 104 coupled to or overlying the substrate 119. In a more particular embodiment, the composite material 1001 may include a substrate 119 and a plurality of one sliding layers 104 overlying the substrate 119. As shown in FIG. 2B, the sliding layer 104 can be coupled to at least a portion of the substrate 119. In a particular embodiment, the sliding layer 104 can be coupled to a surface of the substrate 119 so as to form an interface with another surface of another component. The sliding layer 104 can be coupled to the radially inner surface of the substrate 119. Alternatively, the sliding layer 104 can be coupled to the radially outer surface of the substrate 119.

In a number of embodiments, the sliding layer 104 can include a sliding material. Sliding materials may include, for example, a polymer, such as a polyketone, a polyaramid, a polyphenylene sulfide, a polyethersulfone, a polypheylene sulfone, a polyamideimide, ultra high molecular weight polyethylene, a fluoropolymer, a polybenzimidazole, a polyacetal, polybutylene terephthalate (PBT), polyethylene terephthalate (PET), a polyimide (PI), polyetherimide, polyetheretherketone (PEEK), polyethylene (PE), a polysulfone, a polyamide (PA), polyphenylene oxide, polyphenylene sulfide (PPS), a polyurethane, a polyester, a liquid crystal polymer (LCP), or any combination thereof. In an example, the sliding layer 104 includes polyketone, such as polyether ether ketone (PEEK), polyether ketone, polyether ketone ketone, polyether ketone ether ketone, a derivative thereof, or a combination thereof. In an additional example, the sliding layer 104 may include an ultra high molecular weight polyethylene. In another example, the sliding layer 104 may include a fluoropolymer including fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), or ethylene chlorotrifluoroethylene copolymer (ECTFE). The sliding layer 104 may include a solid based material including lithium soap, graphite, boron nitride, molybdenum disulfide, tungsten disulfide, polytetrafluoroethylene, carbon nitride, tungsten carbide, or diamond like carbon, a metal (such as aluminum, zinc, copper, magnesium, tin, titanium, tungsten, iron, bronze, steel, spring steel, stainless steel), a metal alloy (including the metals listed), an anodized metal (including the metals listed) or any combination thereof. Fluoropolymers may be used according to particular embodiments. In an embodiment, the sliding layer 104 may include a woven mesh or an expanded grid. The sliding layer 104 may be an electrically non-conductive or low-conductive sliding material, e.g. includes a material that is non-conductive or low-conductive.

In a number of embodiments, the sliding layer 104 may further include fillers, including glass, carbon fibers, silicon, PEEK, aromatic polyester, carbon particles, bronze, fluoropolymers, thermoplastic fillers, aluminum oxide, polyamidimide (PAI), PPS, polyphenylene sulfone (PPSO2), LCP, aromatic polyesters, molybdenum disulfide, tungsten disulfide, graphite, graphene, expanded graphite, boron nitrade, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof. Fillers can be in the form of beads, fibers, powder, mesh, or any combination thereof. The fillers may be at least 1 wt % based on the total weight of the sliding layer, such as at least 5 wt %, or even 10 wt % based on the total weight of the sliding layer.

In an embodiment, the sliding layer 104 can have a thickness $T_{SL}$ of between about 1 micron to about 500 microns, such as between about 10 microns and about 350 microns, such as between about 30 microns and about 300 microns, such as between about 40 microns and about 250 microns. In a number of embodiments, the sliding layer 104 may have a thickness $T_{SL}$ of between about 50 and 300 microns. It will be further appreciated that the thickness $T_{SL}$ of the sliding layer 104 may be any value between any of the minimum and maximum values noted above. The thickness of the sliding layer 104 may be uniform, i.e., a thickness at a first location of the sliding layer 104 can be equal to a thickness at a second location therealong. The thickness of the sliding layer 104 may be non-uniform, i.e., a thickness at a first location of the sliding layer 104 can be different from a thickness at a second location therealong. It can be appreciated that different sliding layers 104 may have different thicknesses. The sliding layer 104 may overlie one major surface of the substrate 119, shown, or overlie both major surfaces. The substrate 119 may be at least partially encapsulated by the sliding layer 104. That is, the sliding layer 104 may cover at least a portion of the substrate 119. Axial surfaces of the substrate 119 may be exposed from the sliding layer 104.

Figure 2C:
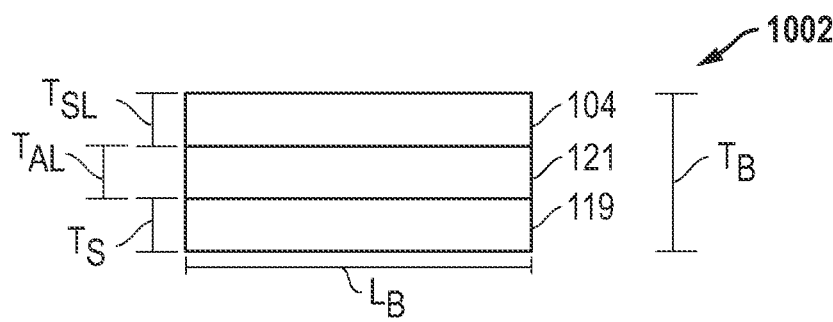
FIG. 2C includes a cross-sectional view of one embodiment of a bearing in accordance with an embodiment.

FIG. 2C includes an illustration of an alternative embodiment of the composite material 1002, alternative to the materials 1000, 1001, that may be formed into the bearing of the first step 12 of the forming process 10. For purposes of illustration, FIG. 2C shows the layer-by-layer configuration of a composite material 1002 of the bearing. According to this particular embodiment, the composite material 1002 may be similar to the composite material 1001 of FIG. 2B, except this composite material 1002 may also include at least one adhesive layer 121 that may couple the sliding layer 104 to the substrate 119 and a sliding layer 104. In another alternate embodiment, the substrate 119, as a solid component, woven mesh or expanded metal grid, may be embedded between at least one adhesive layer 121 included between the sliding layer 104 and the substrate 119.

The adhesive layer 121 may include any known adhesive material common to the art including, but not limited to, fluoropolymers, epoxy resins, polyimide resins, polyether/polyamide copolymers, ethylene vinyl acetates, ethylene tetrafluoroethylene (ETFE), ETFE copolymer, perfluoro-alkoxy (PFA), or any combination thereof. Additionally, the adhesive can include at least one functional group selected from —C=O, —C—O—R, —COH, —COOH, —COOR, —CF$_2$=CF—OR, or any combination thereof, where R is a cyclic or linear organic group containing between 1 and 20 carbon atoms. Additionally, the adhesive can include a copolymer.

In an embodiment, the hot melt adhesive can have a melting temperature of not greater than 250° C., such as not greater than 220° C. In another embodiment, the adhesive may break down above 200° C., such as above 220° C. In further embodiments, the melting temperature of the hot melt adhesive can be higher than 250° C. or even higher than 300° C. The adhesive layer 121 can have a thickness $T_{AL}$ of between about 1 micron to about 80 microns, such as between about 10 microns and about 50 microns, such as between about 20 microns and about 40 microns. In a number of embodiments, the adhesive layer 121 may have a thickness $T_{AL}$ of between about 3 and 20 microns. In a number of embodiments, the adhesive layer 121 may have a thickness $T_{AL}$ of between about 10 and 60 microns. It will be further appreciated that the thickness $T_{AL}$ of the adhesive layer 121 may be any value between any of the minimum and maximum values noted above. The thickness of the adhesive layer 121 may be uniform, i.e., a thickness at a first location of the adhesive layer 121 can be equal to a thickness at a second location therealong. The thickness of the adhesive layer 121 may be non-uniform, i.e., a thickness at a first location of the adhesive layer 121 can be different from a thickness at a second location therealong.

Figure 2D:
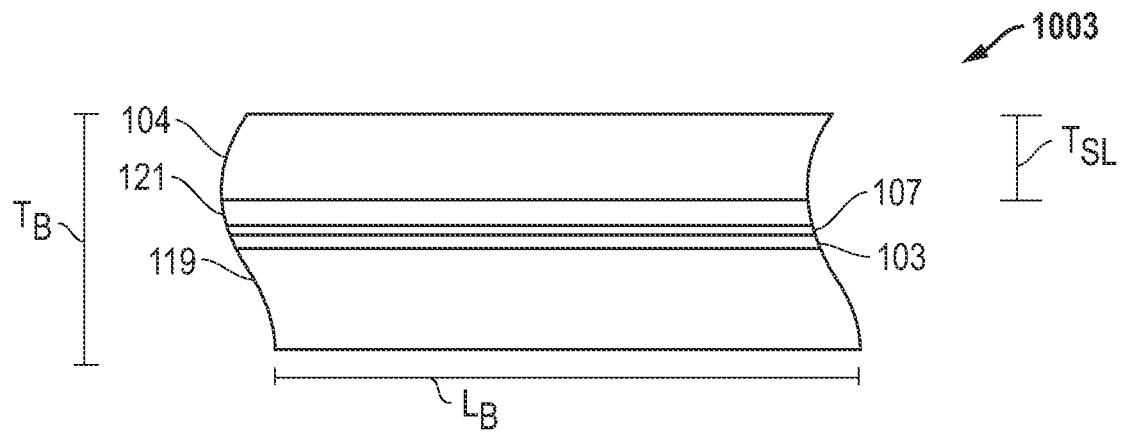
FIG. 2D includes a cross-sectional view of one embodiment of a bearing in accordance with an embodiment.

FIG. 2D includes an illustration of an alternative embodiment of the composite material 1003, alternative to the materials 1000, 1001, 1002, that may be formed into the bearing of the first step 12 of the forming process 10. For purposes of illustration, FIG. 2D shows the layer-by-layer configuration of a composite material 1003 of the bearing. According to this particular embodiment, the composite material 1003 may be similar to the composite material 1002 of FIG. 2C, except this composite material 1003 may also include at least one corrosion protection layer 103, and a sliding layer 104.

The substrate 119 may be coated with corrosion protection layers 103 including corrosion protection material to prevent corrosion of the composite material 1003 prior to processing. Additionally, a functional layer 107 can be applied over layer 103. Each of layers 103 and 107 can have a thickness of about 1 to 50 microns, such as about 7 to 15 microns. Layer 103 can include corrosion protection materials including a phosphate of zinc, iron, manganese, or any combination thereof, or a nano-ceramic layer. Further, layer 103 can include corrosion protection materials including passivated surfaces, commercially available zinc (mechanical/galvanic) or zinc-nickel coatings, or any combination thereof. Layer 107 can include functional silanes, nano-scaled silane based primers, hydrolyzed silanes, organosilane adhesion promoters, solvent/water based silane primers. Corrosion protection layer 103 can be removed or retained during processing.

In an embodiment, under step 12 of FIG. 1, any of the layers on the material or composite material 1000, 1001, 1002, 1003, as described above, can each be disposed in a roll and peeled therefrom to join together under pressure, at elevated temperatures (hot or cold pressed or rolled), by an adhesive, or by any combination thereof. Any of the layers of the material or composite material 1000, 1001, 1002, 1003, as described above, may be laminated together such that they at least partially overlap one another. Any of the layers on the material or composite material 1000, 1001, 1002, 1003, as described above, may be applied together using coating technique, such as, for example, physical or vapor deposition, spraying, plating, powder coating, or through other chemical or electrochemical techniques. In a particular embodiment, the sliding layer 104 may be applied by a roll-to-roll coating process, including for example, extrusion coating. The sliding layer 104 may be heated to a molten or semi-molten state and extruded through a slot die onto a major surface of the substrate 119. In an embodiment, the material or composite material 1000, 1001, 1002, 1003, may be a single unitary strip of material. In another embodiment, the sliding layer 104 may be cast or molded.

In an embodiment, the sliding layer 104 or any layers can be glued to the substrate 119 using the melt adhesive layer 121 to form a laminate. In an embodiment, any of the intervening or outstanding layers on the material or composite material 1000, 1001, 1002, 1003, may form the laminate. The laminate can be cut into strips or blanks that can be formed into the bearing. The cutting of the laminate may include use of a stamp, press, punch, saw, or may be machined in a different way. Cutting the laminate can create cut edges including an exposed portion of the substrate 119.

In an embodiment, under step 14 of FIG. 1, the blanks can be formed into the bearing by curling the ends of the laminate strip or blank. The bearing may be formed by stamp, press, punch, saw, rolling, flanging, deep-drawing, or may be machined in a different way.

After shaping the semi-finished bearing, the semi-finished bearing may be cleaned to remove any lubricants and oils used in the forming and shaping process. Additionally, cleaning can prepare the exposed surface of the load bearing substrate for the application of the coating. Cleaning may include chemical cleaning with solvents and/or mechanical cleaning, such as ultrasonic cleaning.

Figure 3:
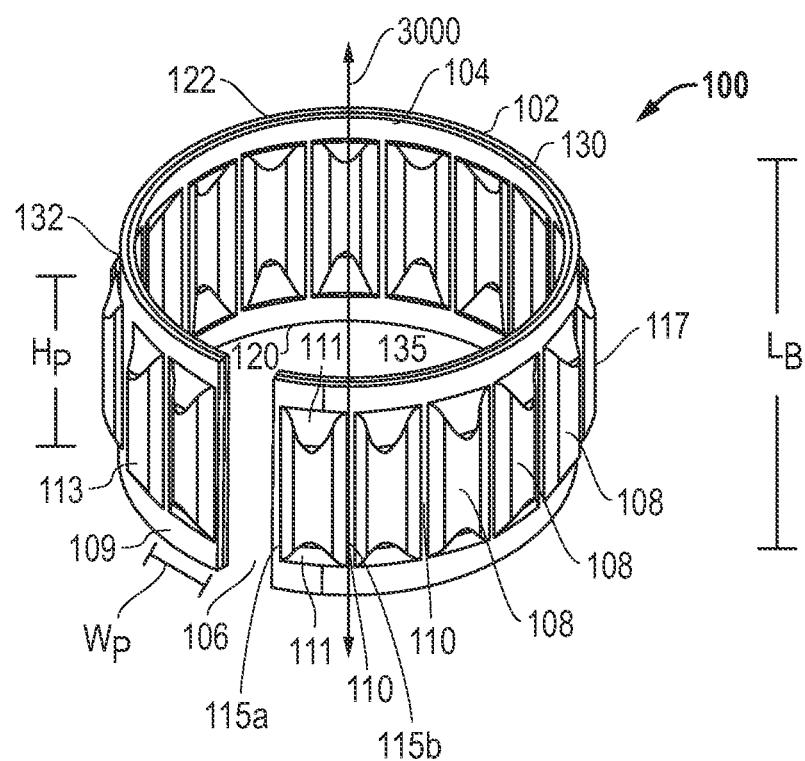
FIG. 3 includes a perspective view of one embodiment of a bearing constructed in accordance with the invention.

FIG. 3 depicts a bearing 100 including one embodiment formed from a blank of material or composite material 1000, 1001, 1002, 1003 as described above. FIG. 3 includes similar features as shown in FIGS. 2A-2D and labeled as such. For a description of those elements, please refer to the prior description of FIGS. 2A-2D. The bearing 100 includes a generally cylindrical sidewall 102. The generally cylindrical sidewall 102 may be formed from a blank as described above and include a substrate 119 (e.g. spring steel) that may be curved into a ring-like (substantially annular) shape about a central axis 3000, forming an aperture 135. The ends of the generally cylindrical sidewall 102 may not meet (e.g., it may be formed as a split ring), thereby leaving an axial gap 106 adjacent the circumference of the generally cylindrical sidewall 102. In other embodiments, the generally cylindrical sidewall may be curved so that the ends overlap with one another. In yet further embodiments, the generally cylindrical sidewall may be a continuous, unbroken ring. The generally cylindrical sidewall 102 may further include a sliding layer 104 that conforms to the shape of the generally cylindrical sidewall 102, as formed as a sliding layer 104 from the blank of composite material 1000, 1001, 1002, 1003 as described above. The bearing 100 and/or generally cylindrical sidewall 102 may have a first axial end 120, and a second axial end 122. The bearing 100 and/or generally cylindrical sidewall 102 may have an inner surface 130, and an outer surface 132. The inner surface 130 of the bearing 100 and/or generally cylindrical sidewall 102 may have a sliding layer 104 that conforms to the shape of the generally cylindrical sidewall with the substrate 119 forming the outer surface 132, as formed from the composite material 1000, 1001, 1002, 1003 as described above. Alternatively or additionally, the outer surface 132 of the bearing 100 may have a sliding layer 104 that conforms to the shape of the generally cylindrical sidewall with the substrate 119 forming the inner surface 130, as formed from the composite material 1000, 1001, 1002, 1003 as described above. In other embodiments, the sliding layer 104 may be laminated onto both surfaces of the bearing 100 and/or generally cylindrical sidewall 102.

The bearing 100 may have a plurality of spaced protrusions 108 that extend radially inward or outward from the outer surface 132 of the bearing 100. The protrusions 108 may be adapted to contact a mating component. For example, FIG. 3 shows the protrusions 108 extending radially outward. The protrusions 108 may be formed from the composite material 1000, 1001, 1002, 1003 via stamping (e.g., pressed using a suitably shaped mold, rotary wave forming, etc.). There may be a flat, circumferentially extending rim 109 of composite material at least one axial end 120, 122 of the bearing 100 above or below the protrusions 108. Each protrusion 108 also may be spaced from its neighboring protrusions 108 by an unformed section 110 and/or a slot of the bearing 100, which may be contiguously formed with rims 109 and spaced circumferentially between a first pair of adjacent protrusions 108. The protrusions 108 may be axially-elongated ridges that may be similar in shape to waves used on conventional bearings. In another embodiment, the protrusions 108 may have a polygonal cross-section from the central axis 3000. The protrusions 108 may include at least one polygonal angle. For example, the protrusions 108 may include a triangle or a quadrilateral shape extending from the generally cylindrical sidewall 102. In yet another embodiment, at least one of the protrusions 108 may have an arcuate portion and a polygonal portion. In another embodiment, the protrusions 108 may have a semi-circular cross-section from the central axis 3000. In another embodiment, the protrusions 108 may have a variable cross-section from the central axis 3000. In an embodiment, at least two of the protrusions 108 may have the same geometric shape or size as compared to each other. In a further embodiment, all of the protrusions 108 may have the same geometric shape or size as compared to each other. In another embodiment, at least one of the protrusions 108 may have different geometric shapes or sizes as compared to each other. In a further embodiment, all of the protrusions 108 may have different geometric shapes or sizes as compared to each other.

At least one of the protrusions 108 may have a circumferential width, $W_P$, defined between a pair of bases 115a, 115b, and a radial height $H_P$, and a circumferential hump 113 extending in the radial direction, the hump 113 rising to and falling from an apex 117 within the circumferential width and being axially bound by a pair of shoulders 111. The apex 117 of the at least one protrusion 108 may be rounded or squared, and the axial ends of each ridge may terminate at the shoulder 111. In some embodiments, the shoulders 111 of the at least one protrusion 108 may be tapered.

In operation, the bearing 100 may be located adjacent to an opposing component. In operation, the bearing 100 may be located between two opposing (mating) components. For example, it may be located in the annular space between an inner component (e.g. a shaft) and a bore in an outer component (e.g. a housing). The protrusions 108 may be compressed between the inner and outer components. In some embodiments, each protrusion 108 may act as a spring and deforms to fit the components together with zero clearance therebetween. In other words, the inner component contacts the inner surfaces 130 of the bearing 100 and the outer component contacts the outer surfaces 132 of the bearing 100. In a number of embodiments, at least one protrusion 108 may have a spring rate of not greater than 30 kN/mm, such as not greater than 25 kN/mm, such as not greater than 15 kN/mm, or such as not greater than 10 kN/mm. In a number of embodiments, at least one protrusion 108 may have a spring rate of at least 0.5 kN/mm, such as at least 1 kN/mm, or such as at least 3 kN/mm. The spring rate may vary depending on the size of the protrusion, the thickness of the generally cylindrical sidewall 102, and dimensions of the bearing 100 as described further below.

Figure 4:
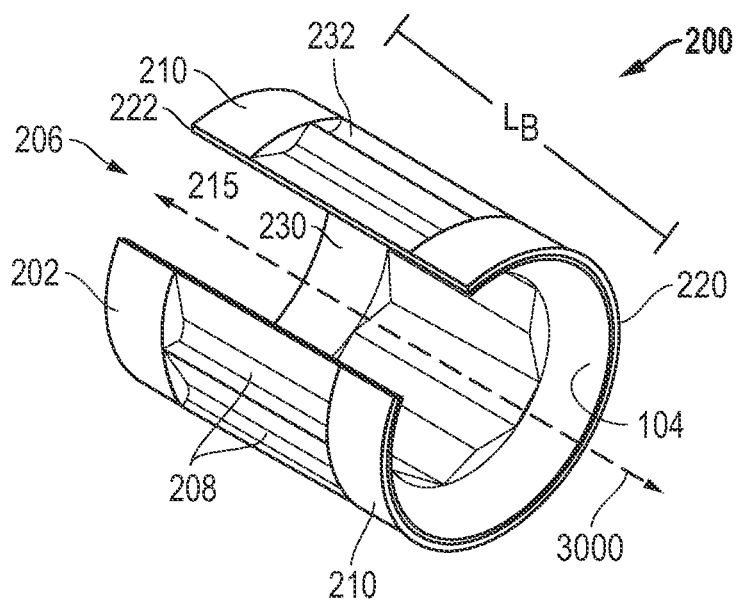
FIG. 4 includes a perspective view of another embodiment of a bearing constructed in accordance with the invention.

FIG. 4 depicts another embodiment of a bearing 200 formed from a blank of material or composite material 1000, 1001, 1002, 1003 as described above. FIG. 4 includes similar features as shown in FIGS. 2A-2D and labeled as such. For a description of those elements, please refer to the prior description of FIGS. 2A-2D. In a similar way to FIG. 3, the bearing 200 and/or generally cylindrical sidewall 202 may have a first axial end 220, and a second axial end 222, and be formed about a central axis 3000, forming an aperture 215. The bearing 200 and/or generally cylindrical sidewall 202 may have an inner surface 230, and an outer surface 232. Further, in a similar way to FIG. 3, the inner surface 230 of the generally cylindrical sidewall 202 may have a sliding layer 104 laminated thereon. Alternatively to FIG. 3, the bearing 200 of FIG. 4 includes a generally cylindrical sidewall 202 that also may have a plurality of protrusions 208, however, the protrusions 208 extend radially inward from its inner surface 130. The protrusions 208 may circumferentially abut one other as shown, or be circumferentially spaced-apart as in the embodiment of FIG. 3. The bearing 200 may be manufactured in a manner as outlined above, so the sliding layer 104 conforms to the shape of the generally cylindrical sidewall 202, including indentations that match the various undulations of the protrusions 208. The bearing 200 includes flat rims or collars 210 at each axial end of the protrusions 208.

Figure 5A:
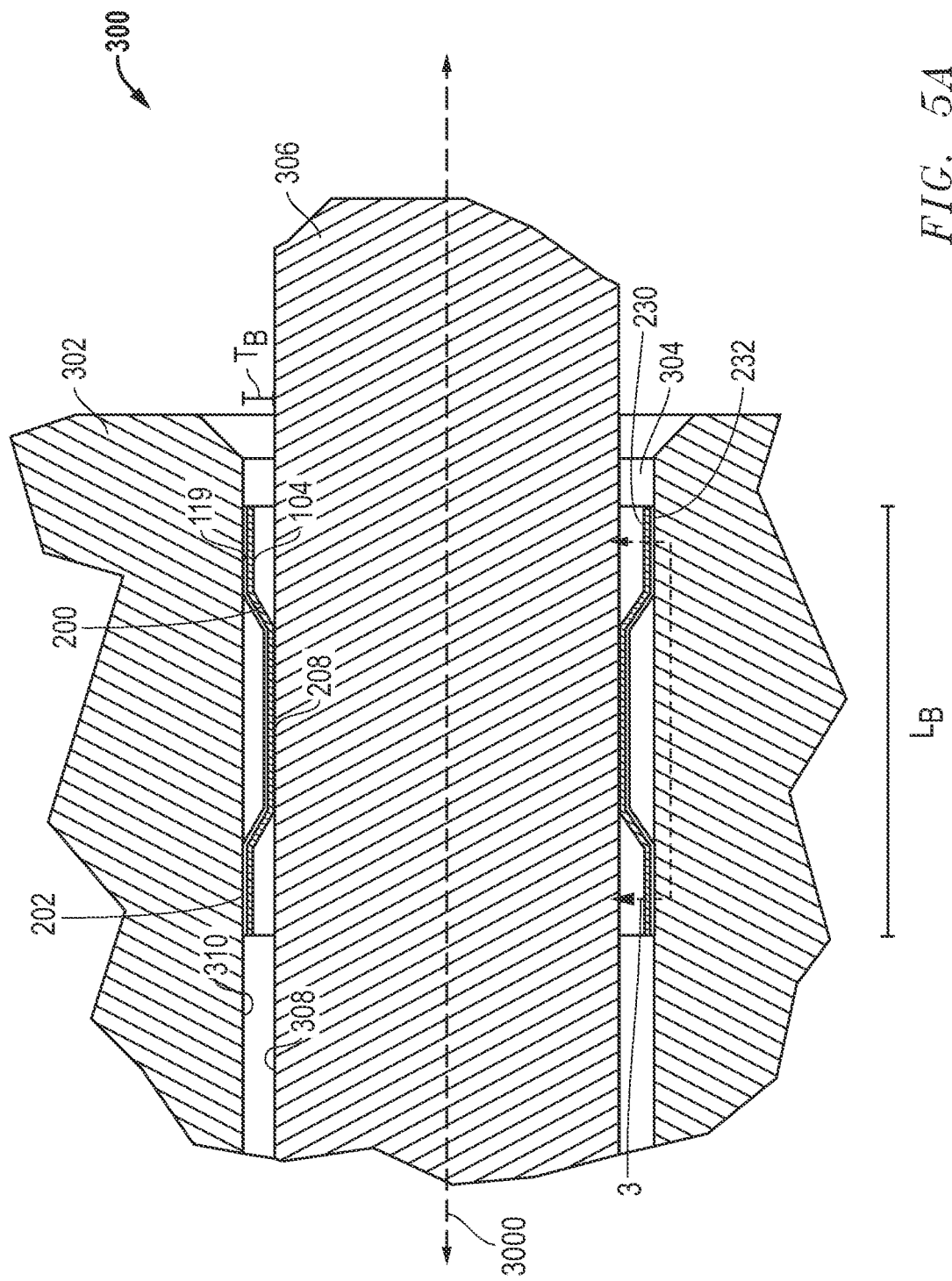
FIG. 5A includes an axial sectional view of the bearing of FIG. 4 in an assembly.

FIG. 5A depicts an axial sectional view through an assembly 300 including an embodiment of a bearing 200. The assembly 300 incorporates, for example, the bearing 200 shown in FIG. 4. Therefore, FIG. 5A includes similar features as shown in FIG. 4 and labeled as such. For a description of those elements, please refer the prior description of FIG. 4. The assembly 300 includes a housing 302 or outer component. The housing 302 may have an axial bore 304 formed therein, which receives a shaft 306 or inner component.

An annular gap exists between the outer surface 308 of shaft 306 and the inner surface 310 of bore 304. The size of this annular gap may be variable because the diameter of the shaft 306 and bore 304 may vary within manufacturing tolerances. To prevent vibration of the shaft 306 within the bore 304, the annular gap may be filled by bearing 200 to form a zero-clearance fit between the components. FIG. 5A shows that the bearing 200 includes a generally cylindrical sidewall 202 with the substrate 119 on the outer surface 132 and a sliding layer 104 on the inner surface 130. Further, in this embodiment, the protrusions 208 extend radially inward toward the inner component 306. In use, the circumferential protrusions 208 of the bearing 200 may be radially compressed in the annular gap between the shaft 306 and housing 302, such that the protrusions 208 contact the inner component 306. The bearing 200 therefore reduces the annular gap to zero so there may not be a clearance between the components in the assembly 300. The bearing 200 may be secured relative to the housing 302 by frictional engagement at the contact area between the generally cylindrical sidewall 202 and the inner surface 310 of the bore 304 or outer component 302. The sliding layer 104 may reduce required torque during use of the bearing 200 within the assembly 300 while maintaining a desired torque range.

Figure 5B:
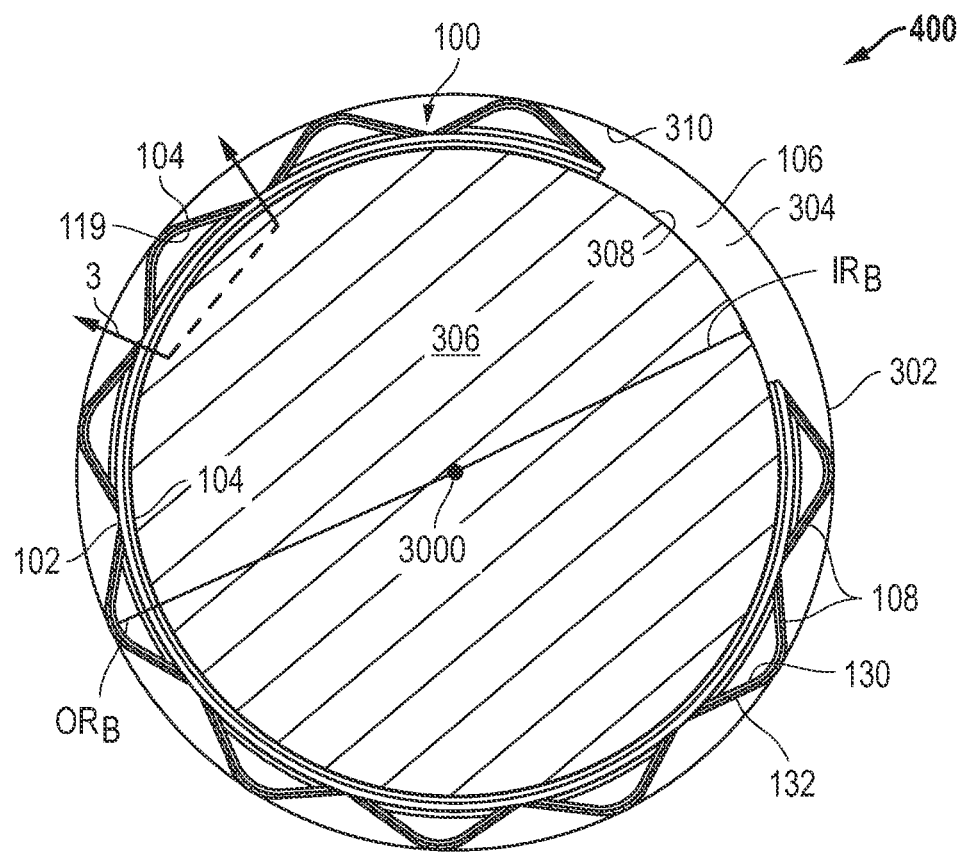
FIG. 5B includes a radial sectional view of the bearing of FIG. 3 in the assembly.

FIG. 5B depicts an axial sectional view through an assembly 400 including another embodiment of a bearing 100. The assembly 400 incorporates, for example, the bearing 100 shown in FIG. 3. Therefore, FIG. 5B includes similar features as shown in FIG. 3 and labeled as such. For a description of those elements, please refer the prior description of FIG. 3. The assembly 400 may also include housing 302 or outer component and shaft 306 or inner component. In the embodiment shown, the bearing 100 may be retained on the shaft 306. The outer diameter of the shaft 306 may be greater than an inner diameter of an exemplary bearing 100 as shown in FIG. 3 at rest. Thus, the bearing 100 may expand (axial gap 106 (FIG. 3) must widen) to fit the bearing around the surface 308 of the shaft. Further, in this embodiment, the protrusions 108 extend radially outward toward the outer component 302. Inside the bore 304 of housing 302, the protrusions 108 may be compressed in the annular gap or space between the components at inner surface 310.

FIG. 5B shows that the bearing 100 includes a generally cylindrical sidewall 102 with the substrate 119 on the inner surface 130 and a sliding layer 104 on the outer surface 132. In use, the circumferential protrusions 108 of the bearing 100 may be radially compressed in the annular gap between the shaft 306 and housing 302, such that the protrusions 108 contact the outer component 302. The bearing 100 therefore reduces the annular gap to zero so there may not be a clearance between the components in the assembly 400. The bearing 100 may be secured relative to the housing 302 by frictional engagement at the contact area between the generally cylindrical sidewall 102 and the outer surface 308 of the inner component 306. The sliding layer 104 may reduce required torque during use of the bearing 100 within the assembly 400 while maintaining a desired torque range.

Figure 6A:
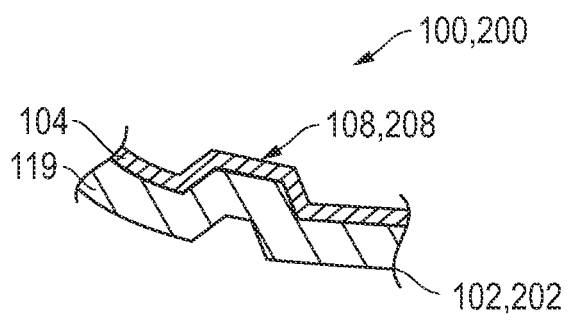
FIGS. 6A, 6B, 6C and 6D are enlarged sectional end views of an embodiment of a layer structure of a bearing, taken along the exemplary line 3-3 of FIG. 5B, showing uninstalled and installed configurations, respectively.
Figure 6B:
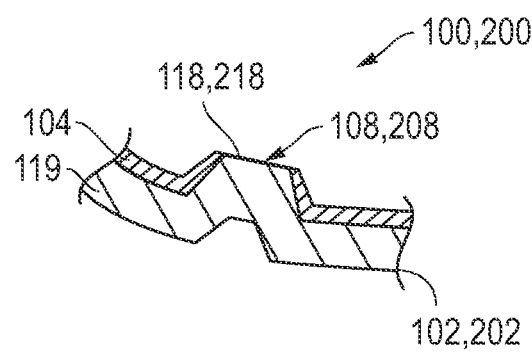
Figure 6C:
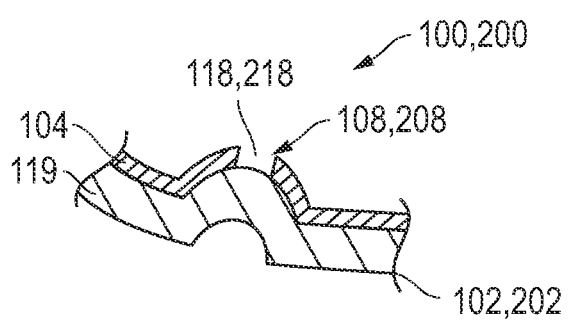

FIGS. 6A-6D include enlarged sectional end views of embodiments of a layer structure of a bearing 100, 200, taken along the exemplary line 3-3 of FIG. 5B, showing bearings 100, 200 in various configurations. FIG. 6E includes a top view of an embodiment of a protrusion 108, 208 of a bearing 100, 200. FIGS. 6A-6E include similar features as shown in FIGS. 3 and 4 and labeled as such. For a description of those elements, please refer to the prior description of FIGS. 3 and 4. In a number of embodiments, as shown in exemplary FIG. 6A, the bearing 100, 200 may include protrusions 108, 208 that have a sliding layer 104. This may be called an uninstalled configuration. In a number of embodiments, as shown in exemplary FIG. 6B, the bearing 100, 200 may include protrusions 108, 208 that include a void area 118, 218 that is free of the sliding layer 104. The void area 118, 218 can be located at a point of contact between the bearing 100, 200 and at least one of the inner component 306 or the outer component 302, which enables the bearing 100, 200 to be electrically conductive and provide electrical conductivity between the bearing and the inner component 306 and the outer component 302 when disposed in an assembly. Generally, the inner component 306 and the outer component 302 are electrically conductive. This may be called an installed configuration. The void area 118, 218 may be located at or near the apex 117 of the protrusion 108, 208. For example, as shown in FIG. 6B or FIG. 6C, some of the sliding layer 104 may be removed prior to installation or scraped off during installation by one of the inner and outer components 306, 302. The geometries for facilitating the removal of these materials may include configuring the diameters of the bearing 100, 200 and protrusions 108, 208, and the parameters of the axial gap 106, 206, with respect to the inner and outer components 306, 302 and the application. For example, the outer diameter of the protrusions 108, 208 may be slightly greater than the inner diameter of the outer component 302. Similarly, the inner diameter of the protrusions 108, 208 may be slightly less than the outer diameter of the inner component 306. It may be contemplated that the bearing 100, 200 may have the low friction layer 104 removed to form the void area 118, 218 in other ways prior to installation between the inner component 306 and the outer component 302.

Figure 6D:
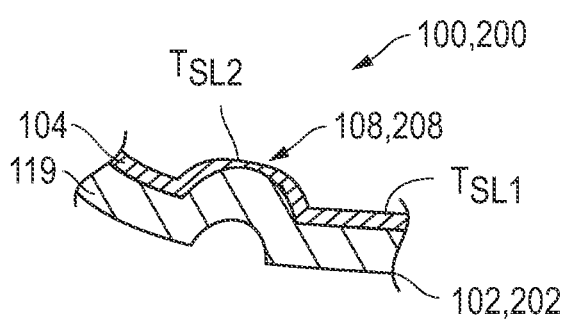
Figure 6E:
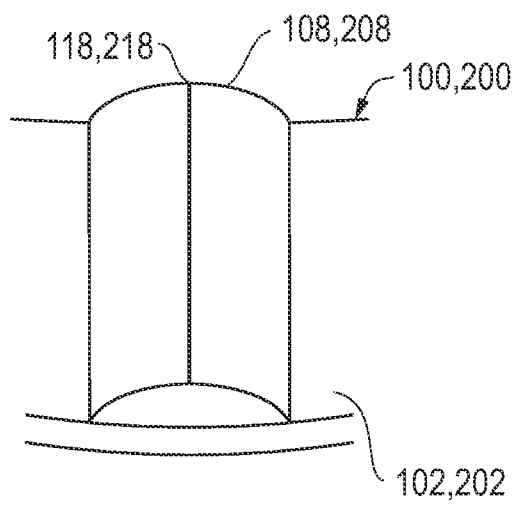
FIG. 6E includes a top view of an embodiment of a protrusion of a bearing.

In a number of embodiments, as shown in exemplary FIG. 6D, the bearing 100, 200 may include protrusions 108, 208 that have a sliding layer 104 similar to FIG. 6A. In some embodiments, the bearing 100, 200 may have a first thickness $T_{SL1}$ of the sliding layer 104 at a first location and a second thickness $T_{SL2}$ of the sliding layer 104 at a first location. In some embodiments, the first thickness $T_{SL1}$ of the sliding layer 104 may be at one of the bases 115a, 115b, of the protrusion 108, 208. In some embodiments, the second thickness $T_{SL2}$ of the sliding layer 104 may be at or near the apex 117 of the protrusion 108, 208. In a number of embodiments, the thickness of the sliding layer at a circumferential base of the protrusion 115a, 115b (i.e. the first location, $T_{SL1}$) may be at least 2 times greater than the thickness of the sliding layer at the apex of the protrusion such that the sliding layer at or near the apex of the protrusion 117 (i.e. the second location, $T_{SL2}$). In this embodiment, the sliding layer 104 at or near the apex of the protrusion 108, 208 would be removed upon application of a sheer force to remove the sliding layer 104 from the substrate 119 to create the void area 118, 218.

The first thickness $T_{SL1}$ of the sliding layer 104 at a circumferential base 115a, 115b of the protrusion 108, 208 may be at least 2 times greater than the second thickness $T_{SL2}$ of the sliding layer 104 may be at or near the apex 117 of the protrusion 108, 208 such that the sliding layer 104 at the apex 117 of the protrusion 108, 208 may be removed upon application of a sheer force to remove the sliding layer 104 from the substrate 119. In some embodiments, the first thickness $T_{SL1}$ of the sliding layer 104 at a circumferential base 115a, 115b of the protrusion 108, 208 may be at least 3 times greater, such as 6 times greater, such as at least 8 times greater, or such as at least 10 times greater than the second thickness $T_{SL2}$ of the sliding layer 104 may be at or near the apex 117 of the protrusion 108, 208 such that the sliding layer 104 at the apex 117 of the protrusion 108, 208 may be removed upon application of a sheer force to remove the sliding layer 104 from the substrate 119.

FIG. 6E illustrates that the void area 118, 218 may not take the entirety of the surface area of the protrusion 108, 208. The void area 118, 218 may just be a thin strip of the protrusion 108, 208 where the sliding layer 104 has been removed. In some embodiments, the void area 118, 218 may extend along the axial length of the protrusion 108, 208, as shown in exemplary FIG. 6D. In some embodiments, the void area 118, 218 may have a surface area of greater than 0.1 mm², greater than 1 mm², such as greater than 2 mm², such as greater than 5 mm², such as greater than 20 mm², or such as greater than 50 mm². In some embodiments, the void area 118, 218 may have a surface area of less than 100 mm² such as less than 30 mm², such as less than 10 mm², such as less than 5 mm², or such as less than 1 mm². It will be further appreciated that the void area 118, 218 may have a surface area that may be any value between any of the minimum and maximum values noted above. It can also be appreciated that the void area 118, 218 may have a surface area that may vary along its axial length or circumferential width and may vary across a plurality of bearings.

In this way, in some embodiments, the bearing 100, 200 may have an uninstalled configuration or in an interim state of manufacture (see, e.g., FIG. 6A) where the bearing 100, 200 may be electrically non-conductive or low-conductive, and an installed configuration (see, e.g., FIG. 6B) where the bearing may be electrically conductive. For example, the uninstalled configuration or interim manufactured state may have an electrical resistivity that may be greater than 10 MΩ, and the installed configuration may have an electrical resistivity that may be less than 1Ω (e.g., about 0 to 0.5Ω). Resistivity is measured from a radially outward side 132 of the bearing 100, 200 to a radially inward side 130 of the bearing 100, 200 along a radially extending line from the central axis 3000 that intersects the bearing 100, 200 at a protrusion at which the void area is to be formed.

In some embodiments, protrusions 108, 208 may extend both radially inward and radially outward relative to the generally cylindrical sidewall 102, 202. In some embodiments, at least one protrusion 108, 208 may extend both radially inward and radially outward relative to the generally cylindrical sidewall 102, 202 of a single bearing 100, 200 (not shown). The installed configuration may include protrusions 108, 208 that may be at least partially void of the sliding layer 104 (see, e.g., FIG. 6B), such that the bearing 100, 200 may be electrically conductive through the protrusions 108, 208. However, in an alternate embodiment, the axial gap 106, 206, may be provided with one or more protuberances, such as burrs, that may extend radially inward and/or outward from the axial gap 106, 206, in the generally cylindrical sidewall 102, 202 of the bearing 100, 200. Like the protrusions 108, 208, the burrs may be provided with the sliding layer 104. To change the bearing 100, 200 from electrically non-conductive or low-conductive to conductive, portions of those materials may be removed from the burrs when the bearing 100, 200 is installed. In some embodiments, a combination of both burrs and protrusions may be used to complete an electrical circuit.

Figure 7A:
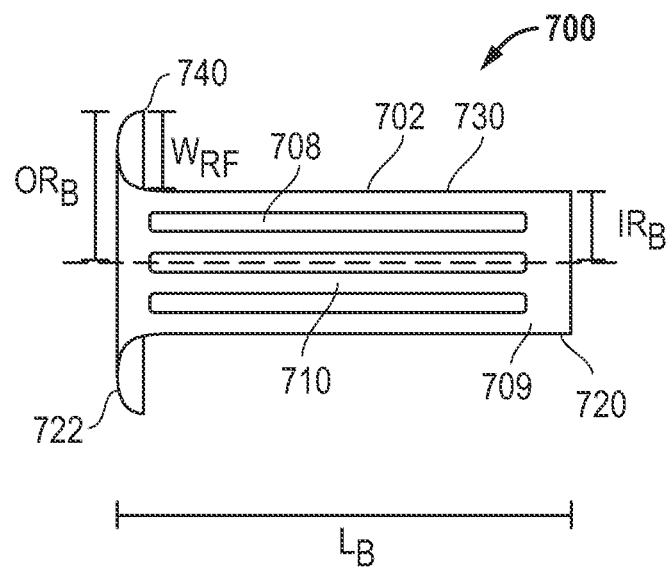
FIG. 7A includes a perspective view of one embodiment of a bearing in accordance with an embodiment.
Figure 7B:
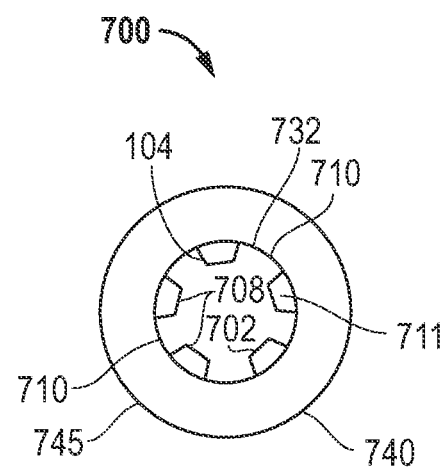
FIG. 7B includes an end view of one embodiment of a bearing in accordance with an embodiment.

FIGS. 7A-B depict various perspective, axial end views of another embodiment of a bearing 700. Bearing 700 includes a similar disposition of the bearings 100, 200 shown above. The bearing 700 includes a generally cylindrical sidewall 702 curved into a tubular configuration with at least one radial flange 740 located at least one axial end 720, 722 of the bearing 700 and extending radially from the generally cylindrical sidewall 702. The inner surface 730 of the generally cylindrical sidewall 702 may have a sliding layer 104 laminated thereon. The generally cylindrical sidewall 702 also may have a plurality of protrusions 708 that extend radially inward. As shown, the protrusions 708 may have a polygonal cross-section in the form of a quadrilateral shape extending from the central axis 3000. The bearing 700 may be manufactured as described herein, so the sliding layer 104 may have a uniform thickness and conforms to the shape of the generally cylindrical sidewall 702. The bearing 700 may include tapered shoulders 711 and flat circumferential rims or collars 709 at each axial end of the protrusions 708, as well as flat spaces 710, that may include slots, between protrusions 708.

Figure 7C:
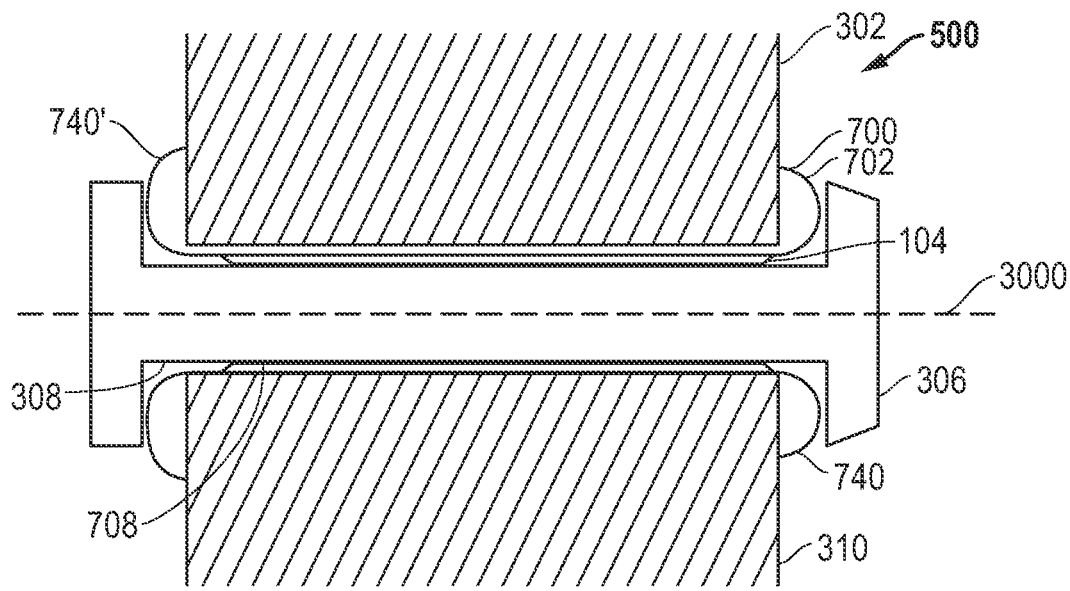
FIG. 7C includes an axial sectional view of the bearing of FIG. 7A in an assembly.

The radial flange 740 can be generally annular about the central axis 3000. The radial flange 740 may project radially outwardly from at least one of the first axial end 720 or the second axial end 722. The radial flange 740 may extend radially outward from the inner surface 130 to the outer surface 132. Alternatively, the radial flange 740 may extend radially inward from the outer surface 132 to the inner surface 130 (not shown). In a number of embodiments, the radial flange 740 may form a generally planar outermost axial surface at the first axial end 720 or the second axial end 722 of the bearing 700. In a number of embodiments, the radial flange 740 may form a generally planar outermost radial surface at the outer surface 132 of the first axial end 720 or the second axial end 722 of the bearing 700. In a number of embodiments, the radial flange 740 may be an extension of the inner surface 730 and outer surface 732 and thus may include a sliding layer 104 that conforms to the shape of the generally cylindrical sidewall 702, as formed as a sliding layer 104 from the blank of composite material 1000, 1001, 1002, 1003 as described above. The radial flange 740 may include a radial flange edge 745 that may be at least partially void of the sliding layer 104, which enables the bearing 700 to be electrically conductive FIG. 7C depicts an axial sectional view through an assembly 304 including another embodiment of a bearing 700. The assembly 500 incorporates, for example, the bearing 700 shown in FIGS. 7A-7B. The assembly 500 includes a housing 302 or outer component. The housing 302 may have an axial bore 304 formed therein, which receives a shaft 306 or inner component. The outer component 302 and the inner component 306 may include similar features of the outer component 302 and the inner component 306 shown in FIGS. 5A-5B. For a description of those elements, please refer the prior description of FIGS. 5A-5B. In use, the circumferential protrusions 708 of the bearing 700 may be radially compressed in the annular gap between the shaft 306 and housing 302, such that the protrusions 708 contact the inner component 306. The bearing 700 therefore reduces the gap to zero so there may be no clearance between the components in the assembly 500. In this embodiment, the bearing 700 may include a first flange 740 and a second flange 740' adapted to be placed outside of the bore 304 and at least partially surround the outer component 302 in the axial direction.

Figure 8:
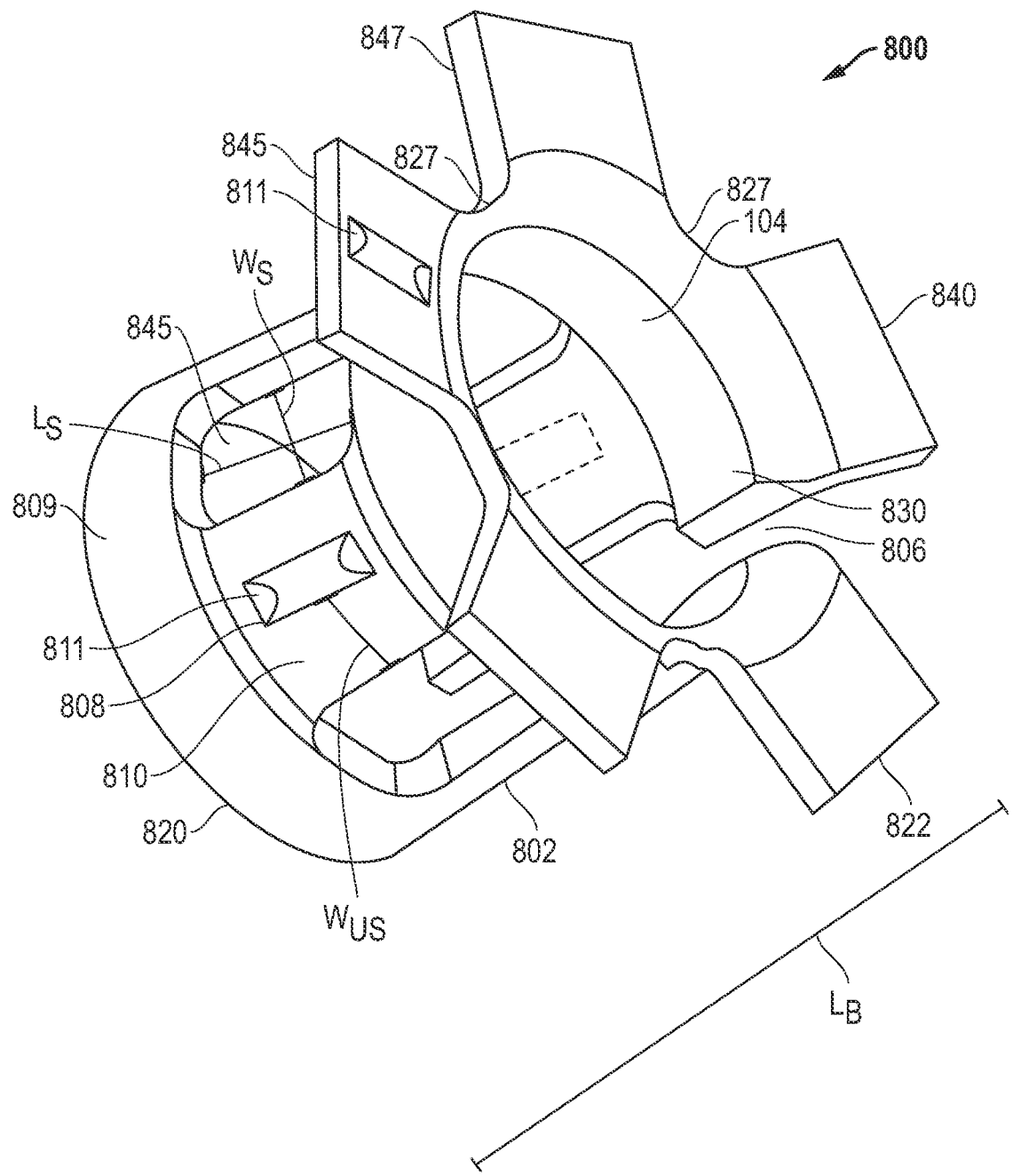
FIG. 8 includes a perspective view of one embodiment of a bearing in accordance with an embodiment.

FIG. 8 depicts a perspective view of another embodiment of a bearing 800. Bearing 800 includes a similar disposition of the bearings 100, 200, 700 shown above. The bearing 800 includes a generally cylindrical sidewall 802 curved into a tubular configuration with at least one radial flange 840 located at least one axial end 820, 822 of the bearing 800. The inner surface 830 of the generally cylindrical sidewall 802 may have a sliding layer 104 laminated thereon. The generally cylindrical sidewall 802 also may have a plurality of protrusions 808 that extend radially inward. The bearing 800 may be manufactured as described herein, so the sliding layer 104 may have a uniform thickness and conforms to the shape of the generally cylindrical sidewall 802. The bearing 800 may include tapered shoulders 811 and flat circumferential rims or collars 809 at each axial end of the protrusions 808, as well as flat spaces 810 between protrusions 808. Further, as stated above, the radial flange 840 may include a radial flange edge 845 that may be at least partially void of the sliding layer 104, which enables the bearing 800 to be electrically conductive. Further still, the radial flange 840 may include a circumferential flange edge 845 that may be at least partially void of the sliding layer 104, which enables the bearing 800 to be electrically conductive.

In a number of embodiments, generally cylindrical sidewall 802 of the bearing 800 can be formed with a plurality of slots 842 that can extend radially through the generally cylindrical sidewall 802 of the bearing 800. In particular, the slots 842 can extend along the unformed sections 810 of the generally cylindrical sidewall 802. Each slot 842 can includes a first end and a second end and each end can be rounded. Further, each slot 842 may be centered circumferentially and longitudinally within each unformed section 810. In a particular aspect, the bearing 800 has a length, LB, and the slot has a length, LS. Further, LS≥50% LB, such as ≥65% LB, or ≥80% LB. In another aspect, LS≤95% LB, such as ≤85% LB, ≤75% LB, ≤60% LB, ≤50% LB. Moreover, LS can be within a range between, and including, any of the percentage of LB values described herein. In another aspect, each unformed section 810 and protrusion 808 has a width, WUS. Further, each slot 842 has a width, WS. In a particular aspect, WS can be ≥50% WUS, such as ≥55% WUS, ≥60% WUS, ≥65% WUS, ≥70% WUS, ≥75% WUS, ≥80% WUS, ≥85% WUS, or ≥90% WUS. In another aspect, WS can be ≤99% WUS, such as ≤98% WUS, ≤97% WUS, ≤96% WUS, or ≤95% WUS. WS can be within a range between, and including, any of the percentage of WUS values described above.

In a number of embodiments, shown best in FIG. 8, the radial flange 840 may include at least one axial split 827 to form a "star-shaped flange." The axial split 827 may provide a gap 806 in the flange 840. In a number of embodiments, the flange 840 may include a plurality of axial splits 827 providing a segmented flange. In certain embodiments, the axial split 827 can be contiguous with an axial gap 806 in the generally cylindrical sidewall 802. In other embodiments, the axial split 827 can be non-contiguous with the axial gap 806 in the generally cylindrical sidewall 802.

Figure 9:
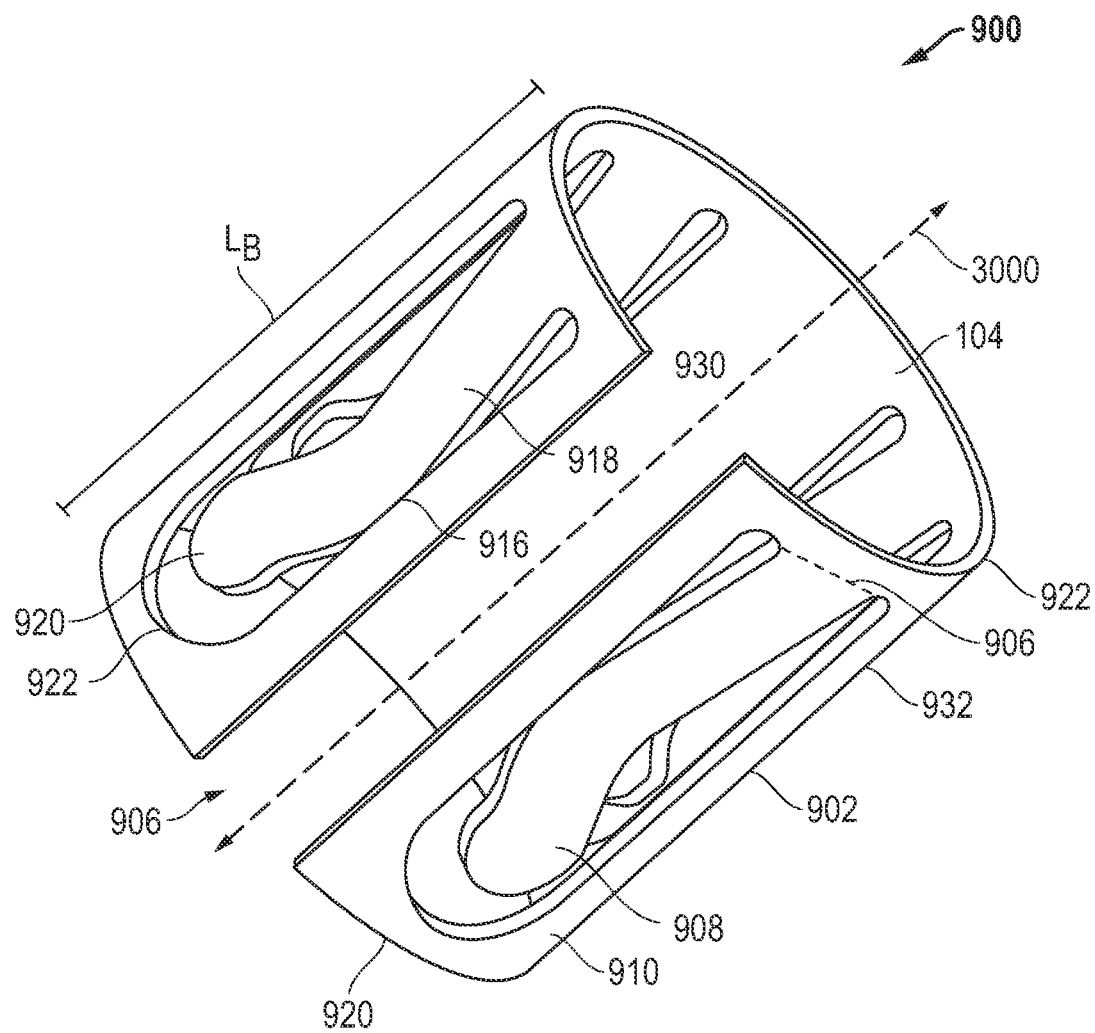
FIG. 9 includes a perspective view of one embodiment of a bearing in accordance with an embodiment.

FIG. 9 depicts a perspective view of another embodiment of a bearing 900. Bearing 900 includes a similar disposition of the bearings 100, 200, 700, and 800 shown above. The bearing 900 includes a generally cylindrical sidewall 902 curved into a tubular configuration with at least one protrusion 908 located circumferentially between unformed sections 910 of the bearing 900. The protrusion 908 may have a variable cross-section from the central axis 3000 and may take the form of an elongated finger. The at least one elongated finger 908 can be coupled to the generally cylindrical sidewall 902 along a first side thereof (indicated at dashed line 906). In an embodiment, the at least one elongated finger 908 can be continuously disconnected from the generally cylindrical sidewall 902 along the remaining sides. In an embodiment, at least one of the elongated fingers 908 may have an arcuate profile. The elongated finger 908 may include at least one generally arcuate edge. In another embodiment, at least one of the elongated fingers 908 may have a polygonal profile. The elongated finger 908 may include at least one polygonal angle. For example, the elongated finger 908 may include a triangle or a quadrilateral shape extending from the generally cylindrical sidewall 902. In yet another embodiment, at least one of the elongated fingers 908 may have an arcuate portion and a polygonal portion.

Each elongated finger 908 can define a radially innermost surface 916 and a bridge portion 918 connecting the radially innermost surface 916 to the generally cylindrical sidewall 902. A best fit line of the bridge portion 918 can cant relative to the central axis 3000. In an embodiment, at least two of the elongated fingers 908 have the same geometric shape or size as compared to each other. In a further embodiment, all of the elongated fingers 908 may have the same geometric shape or size as compared to each other. In another embodiment, at least one of the elongated fingers 908 may have different geometric shapes or sizes as compared to each other. In a further embodiment, all of the elongated fingers 908 may have different geometric shapes or sizes as compared to each other. In a particular embodiment, each elongated finger 908 can further include an end portion 920 extending radially outward from the innermost surface 916. The end portion 920 can extend from the innermost surface 916 opposite the bridge portion 918. In an embodiment, a portion of the end portion 920 of the elongated finger 908 can extend radially outward beyond an outer surface 922 of the generally cylindrical sidewall 902. In another embodiment, an outer surface of the end portion 920 can lie along the same plane as the outer surface 922 of the generally cylindrical sidewall 902. In yet a further embodiment, the outer surface of the end portion 920 can terminate radially inside of the outer surface 922 of the generally cylindrical sidewall 902. The inner surface 930 of the generally cylindrical sidewall 902 may have a sliding layer 104 laminated thereon. The plurality of elongated fingers 908 (or protrusions) may extend radially inward. Further, as stated above, the elongated fingers 908 (or protrusions) may be at least partially void of the sliding layer 104, which enables the bearing 900 to be electrically conductive as described above. Lastly, in a particular embodiment, the radially innermost surface 916 of at least one elongated finger 908 (or protrusion) may include a void area 118, 218 and the end portion 920 may include a void area 118, 218. In this embodiment, the bearing 900 may have electrical contact with both an inner component 306 and an outer component 302 as the elongated finger 908 may have a plurality of protrusions (in the form of the radially innermost surface 916 and the end portion 920).

In a number of embodiments, as shown in FIGS. 3, 4, 5A, 7A, 8, and 9, the bearing 100, 200, 700, 800, 900 may have a length $L_{TR}$ as measured between the first axial end 120, 220, 720, 820, 920 and the second axial end 122, 222, 722, 822, 922 of the bearing 100, 200, 700, 800, 900. It will be appreciated that the length $L_{TR}$ may be substantially similar to the length of the material or composite material 1000, 1001, 1002, 1003 as shown in FIGS. 2A-2D. According to certain embodiment, the length $L_B$ of the bearing 100, 200, 700, 800, 900 may be at least about 2 mm, such as, at least about 5 mm or at least about 10 mm or at least about 50 mm or at least about 100 mm or even at least about 500 mm. According to still other embodiments, the length $L_B$ of the bearing 100, 200, 700, 800, 900 may be not greater than about 1000 mm, such as, not greater than about 500 mm or even not greater than about 250 mm. It will be appreciated that the length $L_B$ of the bearing 100, 200, 700, 800, 900 may be within a range between any of the minimum and maximum values noted above. It will be further appreciated that the length $L_B$ of the bearing 100, 200, 700, 800, 900 may be any value between any of the minimum and maximum values noted above. It can also be appreciated that length $L_B$ of the bearing 100, 200, 700, 800, 900 may vary along its circumference.

In a number of embodiments, as shown best in FIG. 5B, the bearing 100, 200, 700, 800, 900 may have a particular inner radius $IR_B$. For purposes of embodiments described herein, the inner radius, $IR_B$ of the bearing 100, 200, 700, 800, 900 is the distance from the central axis 3000 to the inner surface 130, 230. According to certain embodiment, the inner radius, $IR_B$ of the bearing 100, 200, 700, 800, 900 may be at least about 1 mm or at least about 5 mm or at least about 10 mm or at least about 50 mm or even at least about 100 mm. According to still other embodiments, the inner radius, $IR_B$ of the bearing 100, 200, 700, 800, 900 may be not greater than about 500 mm, such as, not greater than about 150 mm or even not greater than about 50 mm. It will be appreciated that the inner radius, $IR_B$, of the bearing 100, 200, 700, 800, 900 may be within a range between any of the minimum and maximum values noted above. It will be further appreciated that the inner radius, $IR_B$, of the bearing 100, 200, 700, 800, 900 may be any value between any of the minimum and maximum values noted above. It can also be appreciated that the inner radius, $IR_B$, of the bearing 100, 200, 700, 800, 900 may vary along its circumference and may vary across a plurality of bearings.

In a number of embodiments, as shown best in FIG. 5B, the bearing 100, 200, 700, 800, 900 may have a particular outer radius $OR_B$. For purposes of embodiments described herein, the outer radius $OR_B$ of the bearing 100, 200, 700, 800, 900 is the distance from the central axis 3000 to the outer surface 132, 232. In a number of embodiments, as shown in FIGS. 7A-8, the radial flange 740, 840 may form the outer radius $OR_B$ of the bearing 700, 800 when measured radially from the central axis 3000. In a number of embodiments, the inner surface 130, 230, 730, 830 may form the inner radius $IR_B$ of the bearing 300 when measured radially from the central axis 3000. In other words, a radial width of the flange 740, 840 $W_{RF}$ may be the distance from the difference in distance of the outer radius $OR_{TR}$ and the inner radius $IR_B$. According to certain embodiment, the outer radius $OR_{TR}$ of the bearing 100, 200, 700, 800, 900 may be at least about 2 mm or at least about 3 mm, at least 5 mm, at least 10 mm, at least 20 mm or at least about 30 mm or at least about 50 mm or even at least about 100 mm. According to still other embodiments, the outer radius $OR_B$ of the bearing 100, 200, 700, 800, 900 may be not greater than about 500 mm, such as, not greater than about 250 mm or even not greater than about 100 mm. It will be appreciated that the outer radius $OR_B$ of the bearing 100, 200, 700, 800, 900 may be within a range between any of the minimum and maximum values noted above. It will be further appreciated that the outer radius $OR_B$ of the bearing 100, 200, 700, 800, 900 may be any value between any of the minimum and maximum values noted above. It can also be appreciated that the outer radius $OR_B$ of the bearing 100, 200, 700, 800, 900 may vary along its circumference and may vary across a plurality of bearings.

In a number of embodiments, as shown best in FIGS. 2A-2D and 5A, the bearing 100, 200, 700, 800, 900 may have a particular thickness $T_B$. For purposes of embodiments described herein, the thickness $T_B$ of the bearing 100, 200, 700, 800, 900 is the distance from the inner surface 130, 230 to the outer surface 132, 232. It will be appreciated that thickness $T_B$ of the bearing 100, 200, 700, 800, 900 may be substantially similar or the same thickness as the material or composite material 1000, 1001, 1002, 1003 as shown in FIGS. 2A-2D. According to certain embodiment, the thickness $T_B$ of the bearing 100, 200, 700, 800, 900 may be at least about 0.1 mm or at least about 0.2 mm or at least about 0.5 mm or at least about 0.8 mm or even at least about 1.5 mm. According to still other embodiments, the $T_B$ of the bearing 100, 200, 700, 800, 900 may be not greater than about 2 mm, such as, not greater than about 1.5 mm or even not greater than about 1.0 mm. It will be appreciated that the thickness $T_B$ of the bearing 100, 200, 700, 800, 900 may be within a range between any of the minimum and maximum values noted above. It will be further appreciated that the thickness $T_B$ of the bearing 100, 200, 700, 800, 900 may be any value between any of the minimum and maximum values noted above. It can also be appreciated that the thickness $T_B$ of the bearing 100, 200, 700, 800, 900 may vary along its circumference. It can also be appreciated that thickness $T_B$ of the bearing 100, 200, 700, 800, 900 may vary along its circumference and may vary across a plurality of bearings.

Figures 10A, 10B, 10C:
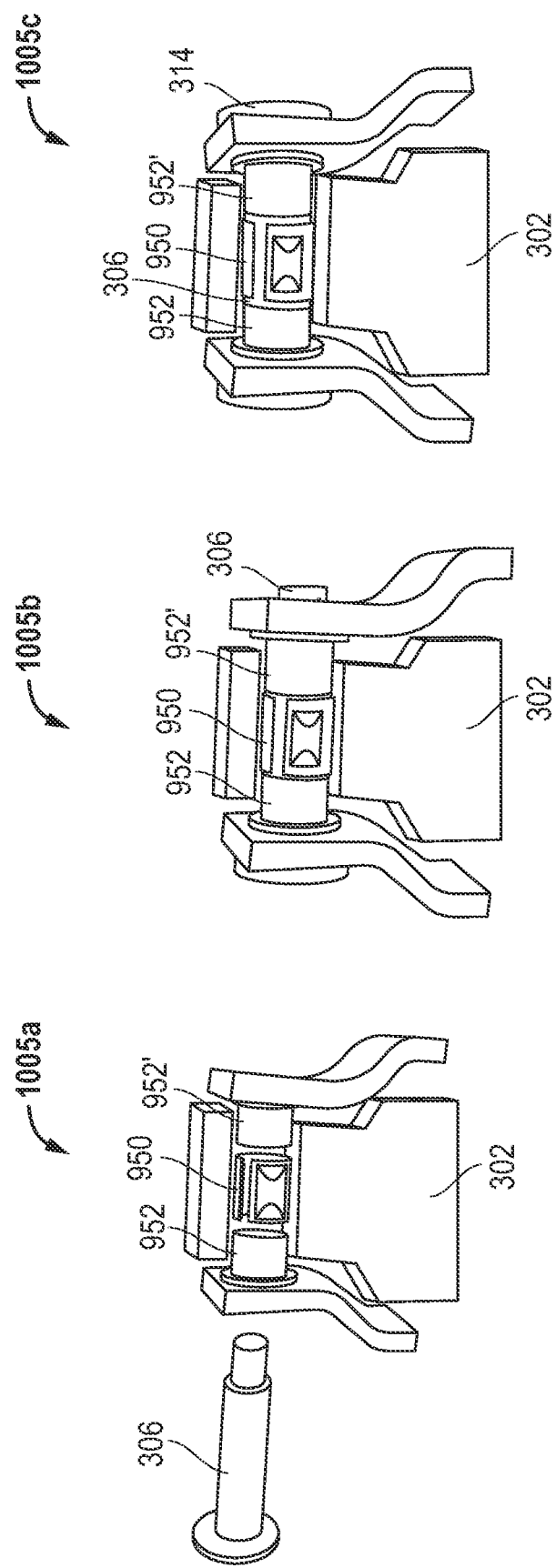
FIG. 10A includes an axial sectional view of a bearing in an assembly.
FIG. 10B includes an axial sectional view of the ring of FIG. 4 in an assembly.
FIG. 10C includes an axial sectional view of the ring of FIG. 4 in an assembly.

FIGS. 10A-10C illustrate a method of assembly of an exemplary hinge assembly, such as an automotive door hinge, hood hinge, tailgate hinge, engine compartment hinge, and the like. The hinge assembly may be used within a vehicle. FIG. 10A illustrates a hinge preassembly 1005*a*. FIG. 10B illustrates a hinge assembly 1005*b*. FIG. 10C illustrates a hinge assembly 1005. The hinge preassembly 1005*a* or hinge assemblies 1005*b*, 1005*c* may include a bearing 950 that may be constructed as described elsewhere herein. The bearing 950 may have similar features to any of the bearings 100, 200, 700, 800, 900 described herein. The hinge preassembly 1005*a* or hinge assemblies 1005*b*, 1005*c* may include at least one secondary bearing 952, 952'. The hinge preassembly 1005*a* or hinge assemblies 1005*b*, 1005*c* may include at least one housing or outer component 302. The hinge preassembly 1005*a* or hinge assemblies 1005*b*, 1005*c* may include at least one shaft or inner component 306. The hinge preassembly 1005*a* or hinge assemblies 1005*b*, 1005*c* may include at least cap 314. The inner component 306 may be inserted into an aperture in the housing 308, bearing 950, and at least one secondary bearing 952, 952' to move from a preassembly 1005*a* (shown in FIG. 10A) to an assembly 1005*b* (shown in FIG. 10B). The at least one secondary bearing 952, 952' may be axially distant from the bearing 950. A cap 314 may be placed over the inner component 306 outside of the housing 308 to move from an assembly 1005*b* (shown in FIG. 9B) to an assembly 1005*c* (shown in FIG. 10C). The cap 314 may be axially distant from the bearing 950. Such assemblies may be used to provide an electrically conductive circuit between the inner component 306, the bearing 950, and the outer component 302 as the bearing 950 may have portions of the sliding layer removed before or during installation of the inner component 306 into the aperture in the bearing 950 such that the bearing 950 is disposed between the inner component 306 and the outer component 302.

Applications for embodiments include, for example, assemblies for hinges and other vehicle components. Further, use of the bearing or assembly may provide increased benefits in several applications such as, but not limited to, door, hood, tailgate, and engine compartment hinges, seats, steering columns, flywheels, driveshaft assemblies, powertrain applications (such as belt tensioners), or other types of applications. According to particular embodiments herein, the bearings may provide electrical conductivity in assemblies with inner and outer components including antennas that may solve or reduce RFI (radio frequency interference) issues. The use of these bearings may replace existing cable solutions. In addition, bearings according to embodiments herein may decrease noise/vibration, reduce wear of the bearing surface and the mating components and reduce complex componentry and assembly time, thereby increasing lifetime, improving visual appearance, and improving effectiveness and performance of the assembly, the bearing, and its other components.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1: A bearing comprising: a generally cylindrical sidewall comprising an electrically conductive substrate, and an electrically non-conductive or low-conductive sliding layer coupled to the substrate, wherein the generally cylindrical sidewall comprises a plurality of protrusions protruding radially inward or radially outward from a bore defining a central axis, wherein at least one protrusion is adapted to contact an opposing component such that at a point of contact the bearing has a void area free of sliding layer so as to provide electrical conductivity between the bearing and the opposing component, and wherein at least one protrusion has a spring rate of not greater than 30 kN/mm, such as not greater than 25 kN/mm, such as not greater than 15 kN/mm, or such as not greater than 10 kN/mm.

Embodiment 2: An assembly comprising: an outer component; an inner component; and a bearing disposed between outer component and inner component, wherein the bearing comprises a generally cylindrical sidewall comprising an electrically conductive substrate, and an electrically non-conductive or low-conductive sliding layer coupled to the substrate, wherein the generally cylindrical sidewall comprises a plurality of protrusions protruding radially inward or radially outward from a bore defining a central axis, wherein at least one protrusion is adapted to contact the outer component or the inner component at a point of contact, wherein at the point of contact, the bearing has a void area free of sliding layer so as to provide electrical conductivity between the outer component and the inner component, and wherein at least one protrusion has a spring rate of not greater than 30 kN/mm, such as not greater than 25 kN/mm, such as not greater than 15 kN/mm, or such as not greater than 10 kN/mm.

Embodiment 3: An assembly comprising: an outer component having a bore defining a central axis; an inner component disposed in the bore of the outer component; and a bearing disposed between inner component and outer component, wherein the bearing comprises a generally cylindrical sidewall comprising an electrically conductive substrate, and an electrically non-conductive or low-conductive sliding layer coupled to the substrate, wherein the generally cylindrical sidewall comprises a plurality of protrusions protruding radially inward or radially outward from the central axis, wherein the bearing has an uninstalled configuration wherein the bearing is electrically non-conductive or low conductive, and an installed configuration wherein the bearing is electrically conductive, wherein electrically low-conductive is defined as having an electrical resistivity value of greater than 10Ω·m measured from a radially outward side of the bearing to a radially inward side of the bearing along a radially extending line from the central axis that intersects the bearing perpendicular to the central axis, and wherein at least one protrusion has a spring rate of not greater than 30 kN/mm, such as not greater than 25 kN/mm, such as not greater than 15 kN/mm, or such as not greater than 10 kN/mm.

Embodiment 4: A method of forming and installing a bearing, comprising: providing a bearing that is electrically non-conductive or low-conductive, an inner component, and an outer component, wherein the bearing comprises a generally cylindrical sidewall comprising an electrically conductive substrate, and an electrically non-conductive or low-conductive sliding layer coupled to the substrate, wherein the generally cylindrical sidewall comprises a plurality of protrusions protruding radially inward or radially outward from a bore defining a central axis; joining the bearing to one of the inner and outer components to form a sub-assembly; and joining the other of the inner and outer components to the sub-assembly to form an assembly, such that the bearing becomes electrically conductive, and forming an electrically conductive circuit between the inner component, the bearing, and the outer component, wherein electrically non-conductive or low-conductive is defined as having an electrical resistivity value of greater than 10Ω·m measured from a radially outward side of the bearing to a radially inward side of the bearing along a radially extending line from the central axis that intersects the bearing perpendicular to the central axis, and wherein at least one protrusion has a spring rate of not greater than 30 kN/mm, such as not greater than 25 kN/mm, such as not greater than 15 kN/mm, or such as not greater than 10 kN/mm.

Embodiment 5: A method of forming a bearing, comprising: providing a blank comprising an electrically conductive substrate, and an electrically non-conductive or low-conductive sliding layer coupled to the substrate; forming a plurality of protrusions in the blank; forming the blank into a bearing comprising a generally cylindrical sidewall wherein the protrusions protrude radially inward or radially outward from the generally cylindrical sidewall, removing sliding layer from the protrusions to form a void area free of sliding layer adapted to contact an inner component or an outer component so as to provide electrical conductivity between the inner component and the outer component, and wherein at least one protrusion has a spring rate of not greater than 30 kN/mm, such as not greater than 25 kN/mm, such as not greater than 15 kN/mm, or such as not greater than 10 kN/mm.

Embodiment 6: The assembly or method of any of embodiments 3-4, wherein at least one protrusion comprises void area free of sliding layer adapted to contact an inner component or an outer component so as to provide electrical conductivity between the inner component and the outer component.

Embodiment 7: The bearing, assembly, or method of any of the preceding embodiments, wherein the sliding layer is disposed on an inner surface of the generally cylindrical sidewall, and the substrate is disposed on an outer surface of the generally cylindrical sidewall.

Embodiment 8: The bearing, assembly, or method of any of the preceding embodiments, wherein the sliding layer is disposed on an outer surface of the generally cylindrical sidewall, and the substrate is disposed on an inner surface of the generally cylindrical sidewall.

Embodiment 9: The bearing, assembly, or method of any of the preceding embodiments, wherein the sliding layer is overlying the substrate on both sides and disposing on an inner surface and an outer surface of the generally cylindrical sidewall.

Embodiment 10: The bearing, assembly, or method of any of the preceding embodiments, wherein each of the protrusions includes a circumferential width and a radial height, and a circumferential hump extending in the radial direction, the hump rising to and falling from an apex within the circumferential width and being axially bound by a pair of shoulders.

Embodiment 11: The bearing, assembly, or method of embodiment 8, wherein the thickness of the sliding layer at a circumferential base of the protrusion is at least 2 times greater than the thickness of the sliding layer at the apex of the protrusion such that the sliding layer at the apex of the protrusion would be removed upon application of a sheer force to remove the sliding layer from the substrate.

Embodiment 12: The bearing, assembly, or method of embodiment 11, wherein the thickness of the sliding layer at a base of the protrusion is at least 3 times greater than the thickness of the sliding layer at an apex of the protrusion, such as at least 6 times greater than the thickness of the sliding layer at an apex of the protrusion, such as at least 8 times greater than the thickness of the sliding layer at an apex of the protrusion, or such as at least 10 times greater than the thickness of the sliding layer at an apex of the protrusion.

Embodiment 13: The bearing, assembly, or method of any of the preceding embodiments, wherein the generally cylindrical sidewall further comprises unformed sections spaced circumferentially between a first pair of adjacent protrusions.

Embodiment 14: The bearing, assembly, or method of embodiments 1, 2, 5, or 6, wherein the generally cylindrical sidewall further comprises a radially extending flange, and wherein the projection and void area is located on the flange.

Embodiment 15: The bearing, assembly, or method of embodiment 14, wherein the flange has a star shape.

Embodiment 16: The bearing, assembly, or method of embodiments 1, 2, 5, or 6, wherein the void area is located on an apex of the protrusion.

Embodiment 17: The bearing, assembly, or method of embodiments 1, 2, 5, or 6, wherein the void area extends along an axial length of the protrusion.

Embodiment 18: The bearing, assembly, or method of embodiments 1, 2, 5, or 6, wherein the void area comprises a surface area of no greater than 50 $mm^2$.

Embodiment 19: The bearing, assembly, or method of embodiments 1, 2, 5, or 6, wherein the void area comprises a surface area of at least 1 $mm^2$.

Embodiment 20: The bearing, assembly, or method of embodiments 1, 2, 5, or 6, wherein the void area is formed upon installation between the outer component and the inner component.

Embodiment 21: The bearing, assembly, or method of embodiments 1, 2, 5, or 6, wherein the void area is formed during installation between the outer component and the inner component.

Embodiment 22: The bearing, assembly, or method of embodiments 1, 2, 5, or 6, wherein the void area is formed prior to installation between the outer component and the inner component.

Embodiment 23: The assembly or method of any of embodiments 3-4, wherein the radially outward side of the bearing intersecting the line comprises a first point and the radially inward side of the bearing intersecting the line comprises a second point, and wherein the first point and the second point are located on a protrusion of the bearing.

Embodiment 24: The assembly or method of any of embodiments 3-4, wherein the radially outward side of the bearing intersecting the line comprises a first point and the radially inward side of the bearing intersecting the line comprises a second point, and wherein the first point and the second point are located on a base of a protrusion of the bearing.

Embodiment 25: The assembly or method of any of embodiments 3-4, wherein the radially outward side of the bearing intersecting the line comprises a first point and the radially inward side of the bearing intersecting the line comprises a second point, and wherein the first point and the second point are located on an unformed section of the bearing.

Embodiment 26: The bearing, assembly, or method of any of the preceding claims, wherein the substrate has a tensile strength of not less than 600 MPa, such as not less than 700 MPa, such as not less than 750 MPa, such as not less than 800 MPa, such as not less than 900 MPa, or such as not less than 1000 MPa.

Embodiment 27: The bearing, assembly, or method of any of the preceding embodiments, wherein the substrate comprises a metal.

Embodiment 28: The bearing, assembly, or method of embodiment 27, wherein the metal comprises a carbon steel or stainless steel.

Embodiment 29: The bearing, assembly, or method of any of the preceding embodiments, wherein the sliding layer comprises a polyketone, polyaramid, a thermoplastic polyimide, a polyetherimide, a polyphenylene sulfide, a polyethersulfone, a polysulfone, a polyphenylene sulfone, a polyamideimide, ultra high molecular weight polyethylene, a thermoplastic fluoropolymer, a polyamide, a polybenzimidazole, or any combination thereof.

Embodiment 30: The bearing, assembly, or method of any of the preceding embodiments, wherein the sliding layer has a thickness within the range of 1 to 500 microns.

Embodiment 31: The bearing, assembly, or method of any of the preceding embodiments, wherein the bearing has an inner radius within the range of 1-50 mm.

Embodiment 32: The bearing, assembly, or method of any of the preceding embodiments, wherein the bearing has an outer radius within the range of 2-100 mm.

Embodiment 33: The bearing, assembly, or method of any of the preceding embodiments, wherein the bearing has a length within the range of 2 to 100 mm.

Embodiment 34: The bearing, assembly, or method of any of the preceding embodiments, wherein the protrusions extend radially inward toward the inner component.

Embodiment 35: The bearing, assembly, or method of any of the preceding embodiments, wherein the protrusions extend radially outward toward the outer component.

Embodiment 36: The bearing, assembly, or method of any of the preceding embodiments, wherein at least one protrusion extends radially inward and at least one protrusion extends radially outward toward the mating components.

Embodiment 37: The bearing, assembly, or method of any of the preceding embodiments, wherein the generally cylindrical sidewall of the bearing can be formed with a plurality of slots that extend radially through the generally cylindrical sidewall of the bearing.

Embodiment 38: The bearing, assembly, or method of any of the preceding embodiments, wherein the bearing has protrusions with a variable cross-section from the central axis, taking the form of an elongated finger.

Embodiment 39: The bearing, assembly, or method of embodiment 38, wherein the elongated finger has a plurality of protrusions.

Embodiment 40: The bearing, assembly, or method of any of the embodiment 38 or 39, wherein the protrusions of the elongated finger have void areas touching the inner and the outer component.

Embodiment 41: The bearing, assembly, or method of any of the embodiment 38, 39 or 40, wherein the contact areas of at least one finger between inner and outer component are free of any electrical non-conductive of low-conductive layer.

Embodiment 42: The bearing, assembly, or method of any of the preceding embodiments, wherein the bearing has an axial gap.

Note that not all of the features described above are required, that a region of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, however, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of assembly and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. A bearing comprising:
a generally cylindrical sidewall comprising an electrically conductive substrate, and
an electrically non-conductive sliding layer coupled to the substrate, wherein the generally cylindrical sidewall comprises a plurality of protrusions protruding radially inward or radially outward from a bore defining a central axis and wherein at least one protrusion has a spring rate of not greater than 30 kN/mm, wherein the thickness of the sliding layer at a circumferential base of the protrusion is at least 2 times greater than the thickness of the sliding layer at the apex of the protrusion, wherein at least one protrusion is adapted to contact an opposing component such that upon contact between the bearing and the opposing component, a void area is created that is free of the sliding layer so as to provide electrical conductivity between the bearing and the opposing component.

2. The bearing of claim 1, wherein the sliding layer is disposed on an inner surface of the generally cylindrical sidewall, and the substrate is disposed on an outer surface of the generally cylindrical sidewall.

3. The bearing of claim 1, wherein the sliding layer is disposed on an outer surface of the generally cylindrical sidewall, and the substrate is disposed on an inner surface of the generally cylindrical sidewall.

4. The bearing of claim 1, wherein the sliding layer is overlying the substrate on both sides and disposed on an inner surface and an outer surface of the generally cylindrical sidewall.

5. The bearing of claim 1, wherein each of the protrusions includes a circumferential width and a radial height, and a circumferential hump extending in the radial direction, the hump rising to and falling from an apex within the circumferential width and being axially bound by a pair of shoulders.

6. The bearing of claim 1, wherein the generally cylindrical sidewall further comprises unformed sections spaced circumferentially between a first pair of adjacent protrusions.

7. The bearing of claim 1, wherein the generally cylindrical sidewall further comprises a radially extending flange.

8. The bearing of claim 1, wherein the at least one protrusion is formed so that the void area would be created at an apex of the protrusion.

9. The bearing of claim 1, wherein the generally cylindrical sidewall of the bearing is formed with a plurality of slots that extend radially through the generally cylindrical sidewall of the bearing.

10. The bearing of claim 1, wherein the protrusions take the form of an elongated finger.

11. The bearing of claim 10, wherein the elongated finger has an arcuate portion and a polygonal portion.

12. An assembly comprising:
an outer component;
an inner component; and
a bearing disposed between the outer component and the inner component, wherein the bearing comprises a generally cylindrical sidewall comprising an electrically conductive substrate, and an electrically non-conductive sliding layer coupled to the substrate, wherein the generally cylindrical sidewall comprises a plurality of protrusions protruding radially inward or radially outward from a bore defining a central axis, wherein at least one protrusion wherein at least one protrusion has a void area has a void area free of the sliding layer so as to provide electrical conductivity between the outer component and the inner component, and wherein at least one protrusion has a spring rate of not greater than 30 kN/mm, wherein the void area extends along an entire axial length of the protrusion.

13. The assembly of claim 12, wherein the protrusions extend radially inward toward the inner component.

14. The assembly of claim 12, wherein the protrusions extend radially outward toward the outer component.

15. The assembly of claim 12, wherein at least one protrusion extends radially inward and at least one protrusion extends radially outward toward the mating components.

16. A method of forming a bearing, comprising:
providing a blank comprising an electrically conductive substrate, and
an electrically non-conductive sliding layer coupled to the substrate;
forming a plurality of protrusions in the blank;
forming the blank into a bearing comprising a generally cylindrical sidewall wherein the protrusions protrude radially inward or radially outward from the generally cylindrical sidewall, wherein the thickness of the sliding layer at a circumferential base of the protrusion is at least 2 times greater than the thickness of the sliding layer at the apex of the protrusion; and
removing the sliding layer from the protrusions to form a void area free of the sliding layer adapted to contact an inner component or an outer component so as to provide electrical conductivity between the inner component and the outer component, and wherein at least one protrusion has a spring rate of not greater than 30 kN/mm, wherein the void area extends along an entire axial length of the protrusion.

17. The method of claim 16, wherein the void area is formed during installation between an outer component and an inner component.

* * * * *